Patented Feb. 20, 1940

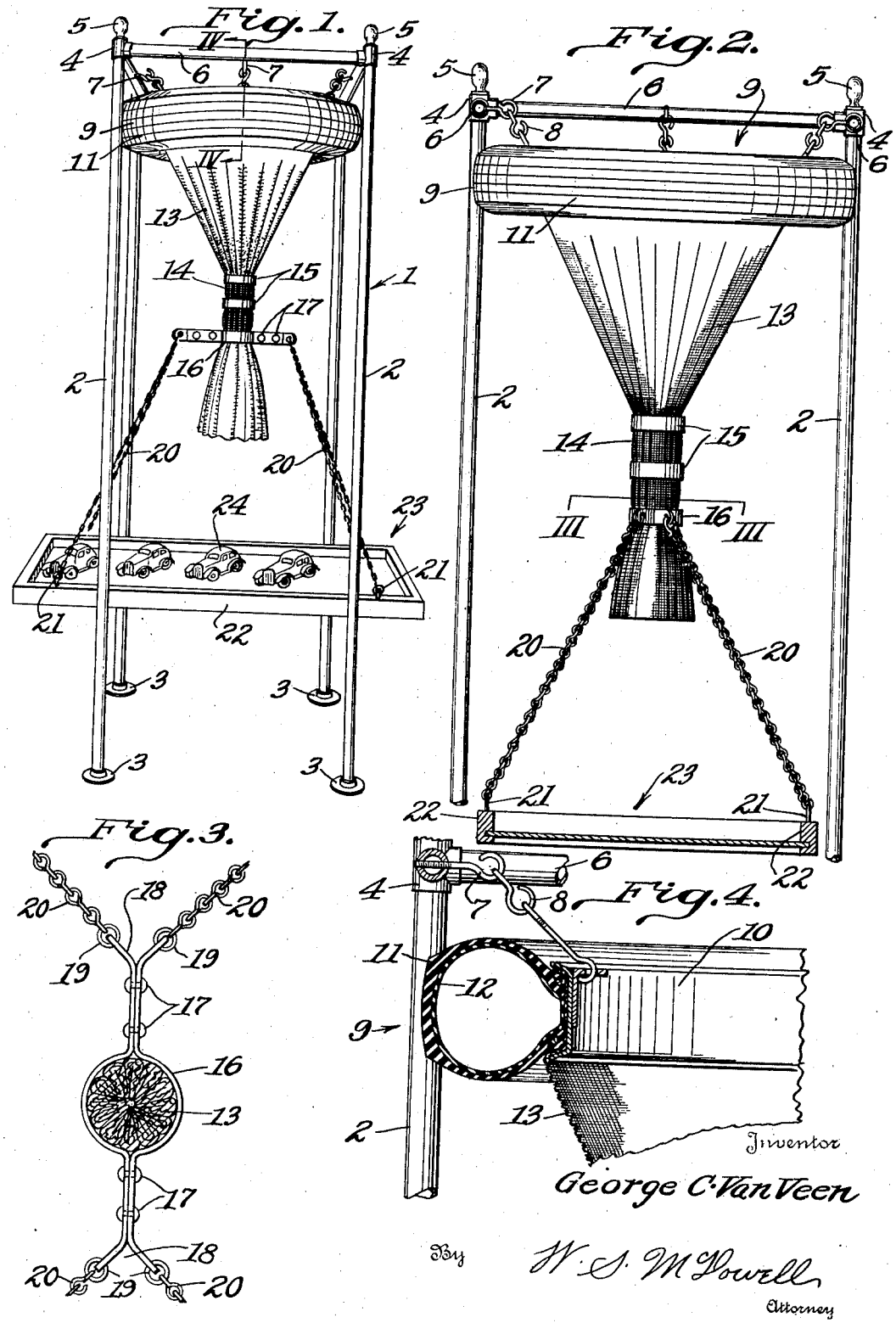

2,190,898

UNITED STATES PATENT OFFICE 2,190,898

EDUCATIONAL DISPLAY DEVICE

George C. Van Veen, Chicago, Ill., assignor to The Pharis Tire & Rubber Company, Newark, Ohio, a corporation of Ohio Application October 8, 1938, Serial No. 234,027

7 Claims. (Cl. 35—49)

This invention relates to an educational display device and has for its principal object the provision of means for supporting a body of fabric of the type employed in vehicle tires, which in turn supports a platform for the reception of load simulating devices.

Another object resides in the provision of a frame in which a vehicle tire is supported in an elevated position. A tubular body of fabric is secured to the vehicle tire and supports at its lower end a tray on which objects may be placed. The purpose of the device is to convey information relative to the characteristics of the fabric in a novel and easily recollected manner.

Other objects will be apparent from the following description and the accompanying drawing in which the preferred form of the invention has been illustrated.

In the drawing:

Fig. 1 is a perspective view of a display device constructed in accordance with the present invention;

Fig. 2 is a view partly in side elevation and vertical section;

Fig. 3 is a detail horizontal sectional view taken on the plane indicated by the line III—III of Fig. 2;

Fig. 4 is a detail vertical sectional view taken on the plane indicated by the line IV—IV of Fig. 1.

Referring more particularly to the drawing, the display device is indicated in its entirety by the numeral 1 and includes a plurality of corner posts 2 formed of tubing or the like, the lower ends of which are provided with flanges 3 for engagement with the floor surface. The upper ends of the corner posts have fittings 4 secured thereto provided with a plurality of angularly related horizontal disposed sockets. In registration with the upper ends of the corner posts, the fittings support ornamental caps 5 to complete the appearance of the structure. Horizontally extending rails 6 have their ends positioned in the sockets in the fittings 4. The various bars of the frame may be secured together in any suitable manner such as by welding to make the frame an integral unit.

The intermediate portions of the rails 6 are formed to include eyelets 7 for the reception of hook members 8 which in turn support a tire assembly 9 including a rim 10 having angle members secured thereto for engagement by the hook members 8. A vehicle tire 11 is mounted on the rim with an inner tube 12 disposed therein. Between the beads of the tire and the rim, there is positioned one end of a tubular fabric body 13 composed of the material used in fabricating of tire carcasses. When the tire is being mounted on the rim, the end of the tubular body is positioned around the rim prior to the location of the tire thereon. As the inner tube is inflated, the beads will be forced against the flanges of the rim and the tube will be securely gripped therebetween.

The opposite end of the tubular fabric body is collapsed as at 14 by a plurality of spaced ring members 15. This arrangement provides a depending fabric cone below the tire to give the display device an improved appearance. Below the rings 15, a split clamp 16 is secured to the collapsed end of the body 13 by means of rivets 17 extending through the sections of the clamp. The ends of the clamp sections are spread apart as at 18 and are perforated to receive ring members 19 carried at the upper ends of chain or other flexible elements 20. At the lower ends, the chain elements engage eyelets 21 carried by the side frame 22 of a tray 23. By reason of the above construction, objects placed on the tray will be supported by the tubular body and will serve to indicate to the observer the strength of the fabric. Any desired objects may be placed on the tray, miniature automobiles 24 being shown for purposes of illustration only.

From the above, it will be seen that there has been provided a display device which is attractive in appearance and will convey to observers desired information. Numerous variations may be employed in the construction of a display device for the purpose indicated and I wish to reserve the right to such variations as may be said to fall within the scope of the appended claims.

What is claimed is:

1. Display apparatus comprising a frame, a horizontally disposed vehicle tire supported at the upper portion of said frame, a fabric body representing the fabric used in the tire structure secured at one end to said tire, and means representing weight supported by the opposite end of said fabric body.

2. Display apparatus comprising a frame, a horizontally disposed vehicle tire supported at the upper portion of said frame, a tubular fabric body representing the fabric used in the tire structure secured at one end in a distended state to said tire, the opposite end of said fabric body being gathered together, a clamp secured to the gathered end of said body, and an object receiving tray supported by said clamp.

3. Display apparatus comprising a frame having elevated horizontally disposed members, a vehicle tire, link means carried by said horizontal members and connected with said tire to support it in a horizontal position, a tubular fabric body representing the fabric used in the tire structure secured at one end to said tire adjacent a rim engaging bead thereon, a clamp secured to the opposite end of said fabric body, and an object receiving tray suspended from said clamp.

4. Display apparatus comprising a frame having elevated horizontally disposed members, a vehicle tire mounted upon a rim, link means connecting said rim and horizontal frame members to support said tire in a horizontal position, a tubular body of fabric representing the fabric used in the tire structure having one end disposed between said tire and its rim, a clamp secured to the opposite end of said fabric body, an object receiving tray, and means for connecting said tray to said clamp.

5. Display apparatus comprising a frame having vertical corner posts, horizontal rails extending between the upper ends of said corner posts, link means carried by the intermediate portion of said horizontal rails, a wheel rim supported in a horizontal plane by said link means, a vehicle tire disposed on said rim, a tubular fabric body representing the fabric used in the tire structure having one end surrounding said rim and being frictionally held thereagainst by said tire, a clamp surrounding the opposite end of said tubular body and holding it in a collapsed condition, and an object receiving tray suspended from said clamp.

6. An educational display device comprising a vertically disposed frame, means provided at the upper portion of said frame for supporting in a distended state one end of a tubular body of fabric of the type embodied in vehicle tire carcasses, means for clamping the opposite end of said tubular body in a collapsed state, and an object receiving tray member suspended from said clamp means, and means on said tray member illustrative of weight whereby an observer will visually deduce the strength of the fabric therefrom.

7. An educational display device comprising a vertically disposed frame, supporting means provided adjacent the upper portion of said frame, a body of fabric of the type embodied in vehicle tire carcasses secured at one end to said supporting means, clamp means carried by the opposite end of said fabric body, and an object receiving member suspended from said clamp means, and means on said receiving member illustrative of weight whereby an observer will visually deduce the strength of the fabric therefrom.

GEORGE C. VAN VEEN.